US012088392B2

(12) United States Patent
Fort

(10) Patent No.: US 12,088,392 B2
(45) Date of Patent: Sep. 10, 2024

(54) LOW-POWER AUTO-CORRELATION ANTENNA SELECTION FOR MULTI-ANTENNA SYSTEM

(71) Applicant: Qorvo US, Inc., Greensboro, NC (US)

(72) Inventor: Andrew Fort, Kessel Lo (BE)

(73) Assignee: Qorvo US, Inc., Greensboro, NC (US)

( * ) Notice: Subject to any disclaimer, the term of this patent is extended or adjusted under 35 U.S.C. 154(b) by 47 days.

(21) Appl. No.: 18/105,913

(22) Filed: Feb. 6, 2023

(65) Prior Publication Data

US 2023/0327744 A1    Oct. 12, 2023

Related U.S. Application Data

(60) Provisional application No. 63/362,534, filed on Apr. 6, 2022.

(51) Int. Cl.
*H04B 7/08*     (2006.01)
*H04B 7/06*     (2006.01)

(52) U.S. Cl.
CPC ......... *H04B 7/0854* (2013.01); *H04B 7/0608* (2013.01); *H04B 7/0639* (2013.01); *H04B 7/0802* (2013.01)

(58) Field of Classification Search
CPC .. H04B 1/1027; H04B 7/0854; H04B 7/0608; H04B 7/0639; H04B 7/0803;
(Continued)

(56) References Cited

U.S. PATENT DOCUMENTS 5,831,981 A     11/1998  Tanimura et al.
7,379,830 B2 *   5/2008  Onu ................... G11B 20/1403
(Continued)

FOREIGN PATENT DOCUMENTS

| CN | 115144821 A  | 10/2022 |
| JP | 2002084153 B2 | 3/2002 |
| JP | 2012122960 A | 6/2012 |

OTHER PUBLICATIONS

Extended European Search Report for European Patent Application No. 23163553.3, mailed Aug. 7, 2023, 10 pages.
Author Unknown, "Core System Package [Low Energy Controller volume]," Specification of the Bluetooth System, vol. 6, Version 5.1, Jan. 21, 2019, Bluetooth SIG, 301 pages.
(Continued)

*Primary Examiner* — Dac V Ha
(74) *Attorney, Agent, or Firm* — Withrow & Terranova, P.L.L.C.

(57) ABSTRACT

Systems and methods for low-power auto-correlation antenna selection for multi-antenna systems are disclosed. In particular, a computing device, such as an Internet of Things (IoT) computing device, may include a transceiver operating with multiple antennas. For example, the computing device may operate under a low-power wireless standard such as Long Range BLUETOOTH LOW ENERGY (LR BLE). In an exemplary aspect, an antenna from amongst the multiple antennas may be selected based on which antenna is receiving a best copy of a periodic signal. The periodic signal is likely indicative of a preamble pattern and, as such, may be used to activate a cross-correlation circuit for signal detection confirmation. Power consumption is reduced by delaying activation of the cross-correlation circuit until a likely signal is detected by detection of the periodic signal.

15 Claims, 6 Drawing Sheets

(58) Field of Classification Search
CPC .............. H04B 7/082; H04L 27/0008; H04W 52/0241; H04W 52/0274
See application file for complete search history.

(56) References Cited

U.S. PATENT DOCUMENTS

| | | | |
|---|---|---|---|
| 7,565,286 B2* | 7/2009 | Gracie | H01Q 1/38 704/207 |
| 7,606,333 B2* | 10/2009 | Troya | H04L 27/2656 375/354 |
| 8,279,974 B1 | 10/2012 | Husted et al. | |
| 10,637,642 B2 | 4/2020 | Fort | |
| 10,667,102 B2 | 5/2020 | Fort | |
| 11,133,890 B2 | 9/2021 | Fort | |
| 2006/0002495 A1 | 1/2006 | Shirakawa et al. | |
| 2006/0133544 A1 | 6/2006 | Kawada et al. | |
| 2010/0135437 A1 | 6/2010 | Lee et al. | |
| 2010/0169675 A1 | 7/2010 | Kajihara | |
| 2010/0233986 A1 | 9/2010 | Yamaji et al. | |
| 2013/0148766 A1* | 6/2013 | Urabe | H04B 17/327 375/343 |
| 2014/0113679 A1 | 4/2014 | Wehrmann et al. | |
| 2015/0303990 A1 | 10/2015 | Chen | |
| 2018/0359077 A1 | 12/2018 | Haine et al. | |
| 2019/0088056 A1 | 3/2019 | Telljohann et al. | |
| 2020/0287658 A1 | 9/2020 | Fort | |
| 2021/0119706 A1 | 4/2021 | Sola et al. | |
| 2021/0120496 A1 | 4/2021 | Desai et al. | |

OTHER PUBLICATIONS

Fort, A. et al., "A performance complexity comparison of auto-correlation and cross-correlation for OFDM Burst Synchronization," 2003 IEEE International Conference on Acoustics, Speech, and Signal Processing (ICASSP'03), Apr. 6-10, 2003, Hong Kong, China, IEEE.

Proakis, J.G., "Digital Communications," Fourth Edition, Boston: McGraw Hill, 2000, 936 pages.

Non-Final Office Action for U.S. Appl. No. 17/457,459, mailed Nov. 25, 2022, 11 pages.

Ho, C.K. et al., "High Bandwidth Efficiency and Low Power Consumption Walsh Code Implementation Methods for Body Channel Communication," IEEE Transactions on Microwave Theory and Techniques, vol. 62, No. 9, Sep. 2014, IEEE, pp. 1867-1878.

Kim, T.-H. et al., "Two-Step Approach for Coarse Time Synchronization and Frequency Offset Estimation for IEEE 802.16D Systems," 2007 IEEE Workshop on Signal Processing Systems, Oct. 17-19, 2007, Shanghai, China, IEEE, 6 pages.

Song, H. et al., "A Secure TOF-Based Transceiver with Low Latency and sub-cm Ranging for Mobile Authentication Applications," 2018 IEEE Radio Frequency Integrated Circuits Symposium (RFIC), Jun. 10-12, 2018, Philadelphia, PA, USA, IEEE, pp. 160-163.

Non-Final Office Action for U.S. Appl. No. 17/457,459, mailed May 22, 2023, 11 pages.

Extended European Search Report for European Patent Application No. 22207882.6, mailed Apr. 11, 2023, 13 pages.

\* cited by examiner

LOW-POWER AUTO-CORRELATION ANTENNA SELECTION FOR MULTI-ANTENNA SYSTEM

PRIORITY CLAIM

The present application claims priority to U.S. Provisional Patent Application Ser. No. 63/362,534 filed on Apr. 6, 2022, entitled "LOW-POWER AUTO-CORRELATION ANTENNA SELECTION FOR MULTI-ANTENNA SYSTEM," the contents of which is incorporated herein by reference in its entirety.

BACKGROUND

I. Field of the Disclosure

The technology of the disclosure relates generally to diversity antennas in low-power environments.

II. Background

Computing devices abound in modern society, and more particularly, mobile communication devices have become increasingly common. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences. With the advent of the myriad functions available to such devices, there has been increased pressure to find ways to reduce power consumption. The pressure to reduce power consumption is particularly acute in the class of computing devices known as the Internet of Things (IoT), which are typically small, wearable devices that operate at relatively short ranges and are coin-cell battery-powered.

Historically, IEEE 802.15.4 (Zigbee) has been used for IoT devices. Where Zigbee has been used in devices having multiple antennas, the long synchronization word used by Zigbee has allowed a single radio frequency front end (RFFE) to be used for all antennas in a time-sharing arrangement. More detail on such an approach can be found in U.S. Pat. No. 5,831,981. There has been a movement in the industry to move towards BLUETOOTH LOW ENERGY (BLE). For success in a smart-home environment, BLE radio designs must be low-power and provide sufficient range to cover an entire household, even where line-of-sight may be compromised. Long Range BLE (LR BLE) has been developed to assist in such situations. The advent of LR BLE provides room for innovation.

SUMMARY

Aspects disclosed in the detailed description include systems and methods for low-power auto-correlation antenna selection for multi-antenna systems. In particular, a computing device, such as an Internet of Things (IoT) computing device, may include a transceiver operating with multiple antennas. The computing device may, for example, operate under a low-power wireless standard such as Long Range BLUETOOTH LOW ENERGY (LR BLE). In an exemplary aspect, an antenna from amongst the multiple antennas may be selected based on which antenna is receiving a best copy of a periodic signal. The periodic signal is likely indicative of a preamble pattern and, as such, may be used to activate a cross-correlation circuit for signal detection confirmation. Power consumption is reduced by delaying activation of the cross-correlation circuit until a likely signal is detected by detection of the periodic signal.

In this regard, in one aspect, a receiver is disclosed. The receiver comprises a first auto-correlation circuit configured to receive a first sampled signal from a first antenna to detect a periodic signal within the first sampled signal. The receiver also comprises a second auto-correlation circuit configured to receive a second sampled signal from a second antenna to detect the periodic signal within the second sampled signal. The receiver also comprises a comparator coupled to the first auto-correlation circuit and the second auto-correlation circuit and configured to indicate which of the first auto-correlation circuit and the second auto-correlation circuit better detects the periodic signal. The receiver also comprises a correlation circuit coupled to the first auto-correlation circuit and the second auto-correlation circuit and configured to perform a correlation on one of the first sampled signal or the second sampled signal. The receiver also comprises a control circuit configured to keep the correlation circuit inactive until the periodic signal is detected by one of the first auto-correlation circuit or the second auto-correlation circuit.

In another aspect, a method for controlling a receiver is disclosed. The method comprises receiving a first sampled signal and a second sampled signal. The method also comprises performing an auto-correlation on the first sampled signal with a first delay to determine a periodicity of the first sampled signal. The method also comprises performing an auto-correlation on the second sampled signal with the first delay to determine a periodicity of the second sampled signal. The method also comprises selecting the first sampled signal or the second sampled signal based on which has a better correlation for a given periodicity. The method also comprises turning on a correlation circuit to correlate a selected signal from amongst the first sampled signal and the second sampled signal.

DETAILED DESCRIPTION

Figure 1:
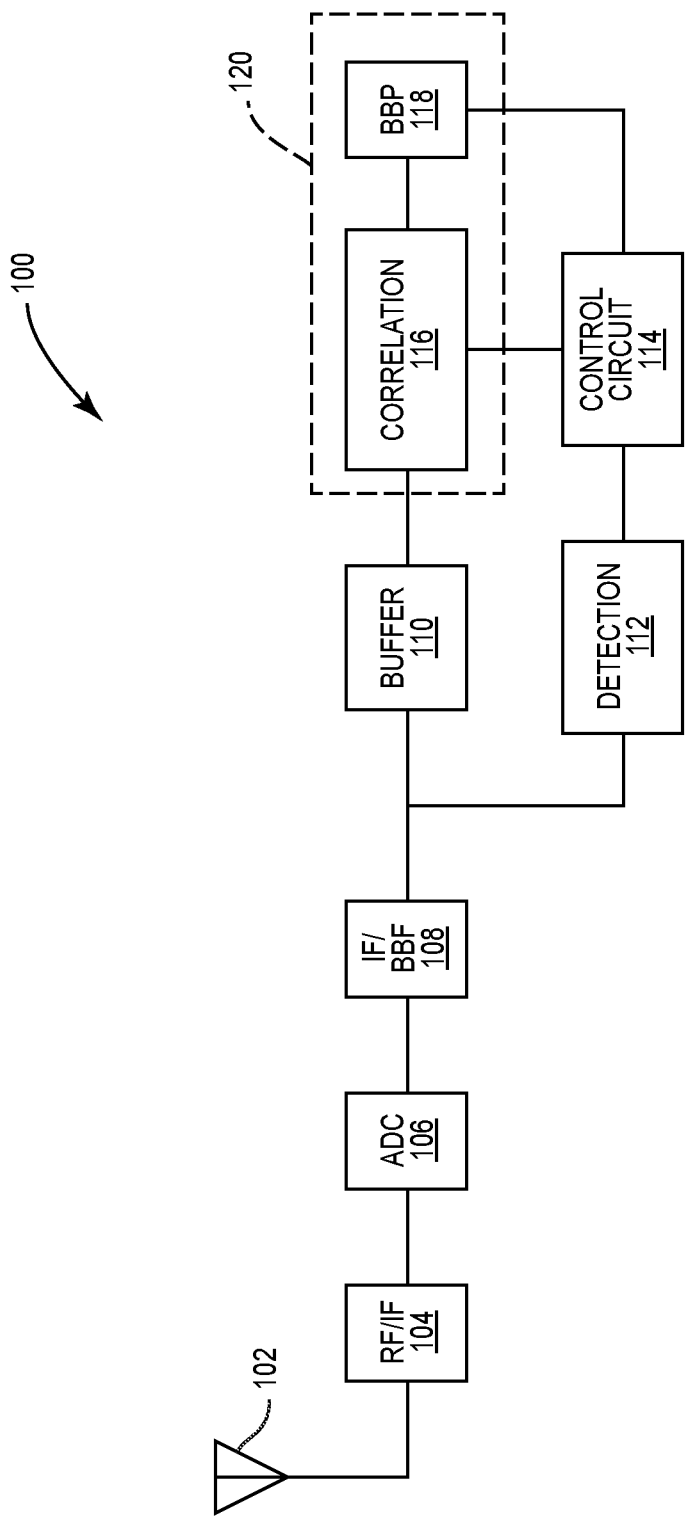
FIG. 1 is a block diagram of a conventional single antenna receiver that detects incoming signals.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that although the terms first, second, etc. may be used herein to describe various elements, these elements should not be limited by these terms. These terms are only used to distinguish one element from another. For example, a first element could be termed a second element, and similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element, or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include systems and methods for low-power auto-correlation antenna selection for multi-antenna systems. In particular, a computing device, such as an Internet of Things (IoT) computing device, may include a transceiver operating with multiple antennas. The computing device may, for example, operate under a low-power wireless standard such as Long Range BLUETOOTH LOW ENERGY (LR BLE). In an exemplary aspect, an antenna from amongst the multiple antennas may be selected based on which antenna is receiving a best copy of a periodic signal. The periodic signal is likely indicative of a preamble pattern and, as such, may be used to activate a cross-correlation circuit for signal detection confirmation. Power consumption is reduced by delaying activation of the cross-correlation circuit until a likely signal is detected by detection of the periodic signal.

Before addressing exemplary aspects of the present disclosure, a brief overview of a conventional receiver is provided with reference to FIG. 1. A discussion of exemplary aspects of the present disclosure begins below with reference to FIG. 2.

As noted above, there has been a movement to BLE for IoT devices and, more specifically, to LR BLE. In a traditional receiver, such as receiver 100, illustrated in FIG. 1, there is a single antenna 102. Electromagnetic radiation in the form of waves that carry signals modulated into the waves impinges on the antenna 102, exciting a current corresponding to the modulated signals on the waves. This current is typically in the radio frequency (RF) portion of the electromagnetic spectrum and is downconverted to an intermediate frequency (IF) signal by a first downconversion circuit 104. The IF signal may then be converted from an analog signal to a digital signal by an analog-to-digital converter (ADC) circuit 106. The digital IF signal may then be downconverted to a baseband frequency (BBF) signal by a second downconversion circuit 108. Note that the downconversion circuits 104 and 108 may be combined into a single downconversion circuit taking the RF signal to a BBF signal in a single step. Likewise, the ADC circuit 106 may be repositioned before or after such a downconversion circuit as needed or desired.

The BBF signal is buffered in a buffer circuit 110 while a detection circuit 112 determines if the received signal is a signal of interest. A control circuit 114 may use information from the detection circuit 112 in controlling a correlation circuit 116. When the correlation circuit 116 confirms the presence of a signal of interest, the signal may be further processed by a baseband processor (BBP) 118 as is conventional. The correlation circuit 116 and the BBP 118, collectively circuit 120, consume relatively large amounts of power relative to other portions of the receiver 100. Past efforts by the assignee of the present disclosure may have controlled operation of the circuit 120 with the control circuit 114 based on the detection circuit 112.

Typically, the detection circuit 112 would infer the presence of an incoming signal based on an increase in a received signal strength indicator (RSSI). While this approach works for BLE and ZIGBEE-type systems, this approach is suboptimal for an LR BLE signal, which may have a signal level below the noise threshold and not readily be detected by an RSSI detection circuit. This situation may be exacerbated when the receiver is designed to operate in multiple wireless standards and have different signals of interest at different power levels impinging on the antenna 102. Continuous operation of the correlation circuit 116 consumes excessive amounts of power.

Exemplary aspects of the present disclosure provide two solutions to the concerns arising from the use of traditional receivers in an LR BLE environment. As a first solution, a receiver may use multiple antennas. The receiver may select between antennas based on which antenna has better signal reception. As a second solution, exemplary aspects of the present disclosure provide initial signal detection using a low-power auto-correlation circuit to determine whether incoming signals contain any periodic characteristics matching known preamble patterns for wireless standards of interest. For example, BLE has a preamble pattern that repeats every four microseconds (4 µs), LR BLE has a preamble pattern that repeats every 8 µs, and ZIGBEE has a preamble pattern that repeats every 16 µs. A control circuit may activate a correlation circuit and BBP if an appropriately-periodic signal is detected. By delaying activation of the correlation circuit and BBP, power consumption is reduced while still providing for ready signal detection.

Figure 2:
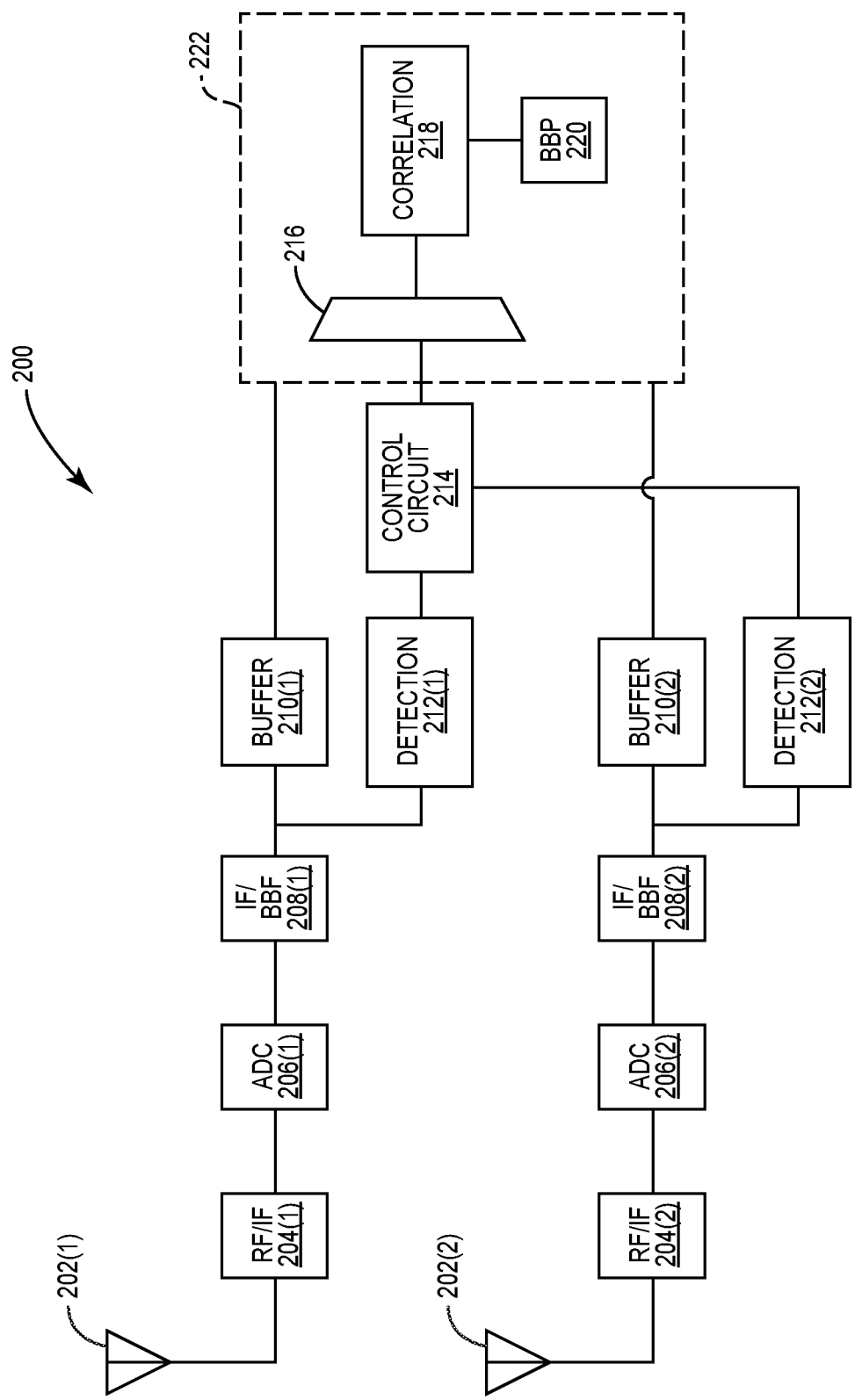
FIG. 2 is a block diagram of a multiantenna receiver that detects periodic signals according to the present disclosure before activating correlation circuitry.

FIG. 2 illustrates a receiver 200 having multiple antennas 202(1)-202(2) with associated detection and control circuitry according to exemplary aspects of the present disclosure. As with the receiver 100 of FIG. 1, electromagnetic radiation in the form of waves that carry signals modulated into the waves impinges on the antennas 202(1)-202(2), exciting a current corresponding to the modulated signals on the waves. This current is downconverted to an IF signal by first downconversion circuits 204(1)-204(2). The IF signal may then be converted from an analog signal to a digital signal by ADC circuits 206(1)-206(2). The digital IF signal may then be downconverted to a BBF signal by second downconversion circuits 208(1)-208(2). Again, the downconversion may be combined, and the ADC circuits 206(1)-206(2) may be repositioned.

The BBF signal is buffered in buffer circuits 210(1)-210(2) while detection circuits 212(1)-212(2) determine if the received signal is a signal of interest. A control circuit 214 may use information from the detection circuits 212(1)-212(2) to use a multiplexer (MUX) 216 to provide a selected signal to a correlation circuit 218. When the correlation circuit 218 confirms the presence of a signal of interest, the signal may be further processed by a BBP 220. The correlation circuit 218 and the BBP 220 (collectively high-power elements 222) remain inactive until the control circuit 214 activates them responsive to detection of a periodic signal.

While two antennas 202(1)-202(2) and detection circuits 212(1)-212(2) are shown, it should be appreciated that the present disclosure may be expanded to more than two antennas if desired.

Figure 3:
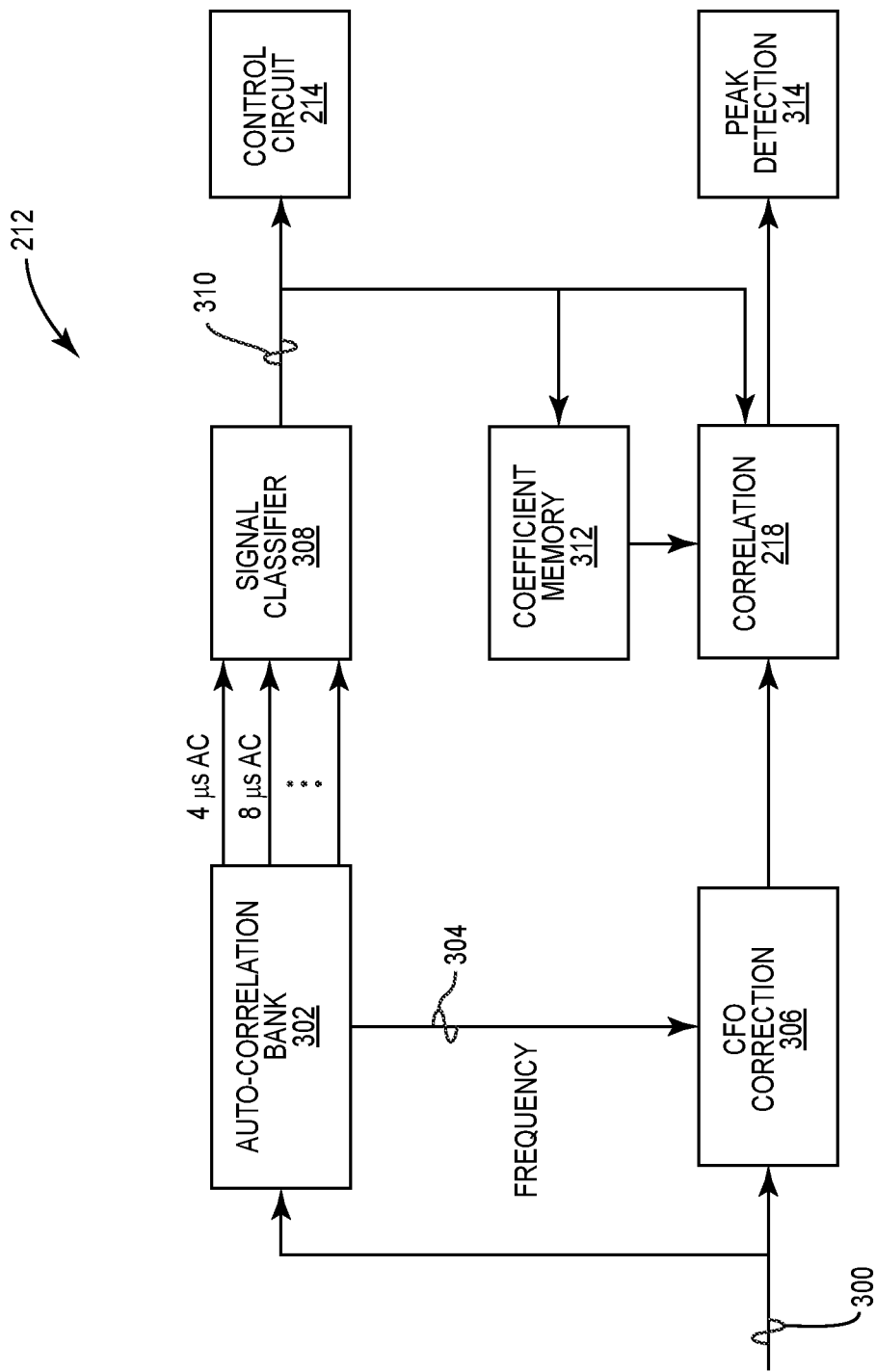
FIG. 3 is a block diagram of a detection circuit that can be used in the multiantenna receiver of FIG. 2.

Details about portions of a detection circuit 212 are provided in FIG. 3. Specifically, an incoming signal 300 is split and provided to an auto-correlation circuit 302. In an exemplary aspect, the auto-correlation circuit 302 is a bank of a plurality of individual auto-correlation circuits 400 (see FIG. 4) that test for periodicity at a plurality of different frequencies. The auto-correlation circuit 302 may provide a frequency signal 304 to a carrier frequency offset (CFO) circuit 306. Where the auto-correlation circuit 302 is a bank, the auto-correlation circuit 302 also provides auto-correlation (AC) values to a signal classifier circuit 308. In an exemplary aspect, the AC values may correspond to known pattern periods (e.g., 4 µs for BLE, 8 µs for LR BLE, and 16 µs for ZIGBEE) and indicate how well correlated each pattern is.

The signal classifier circuit 308 may use the AC values to determine which protocol is most likely being used in the signal of interest. The signal classifier circuit 308 may compare the AC values to a threshold to determine which protocol is being used. Note that because the preamble patterns are likely harmonics of one another, the signal classifier circuit 308 may check the shortest pattern first (e.g., checking at 16 µs will return a positive result for ZIGBEE, BLE, and LR BLE, so checking at 4 µs will return a positive result only for BLE, and if this value is below the threshold, then checking at 8 µs for LR BLE, and if that value is below the threshold, then checking at 16 µs). The signal classifier circuit 308 outputs a signal 310 that indicates which protocol is likely being received, which may be used by the control circuit 214. The control circuit 214 may use this information to control other radio subsystems (e.g., to turn on the correlation circuit 218). The signal 310 is also provided to a memory element 312 that stores coefficients that are used by the correlation circuit 218. The correlation circuit 218 may output a peak detection signal 314.

Figure 4:
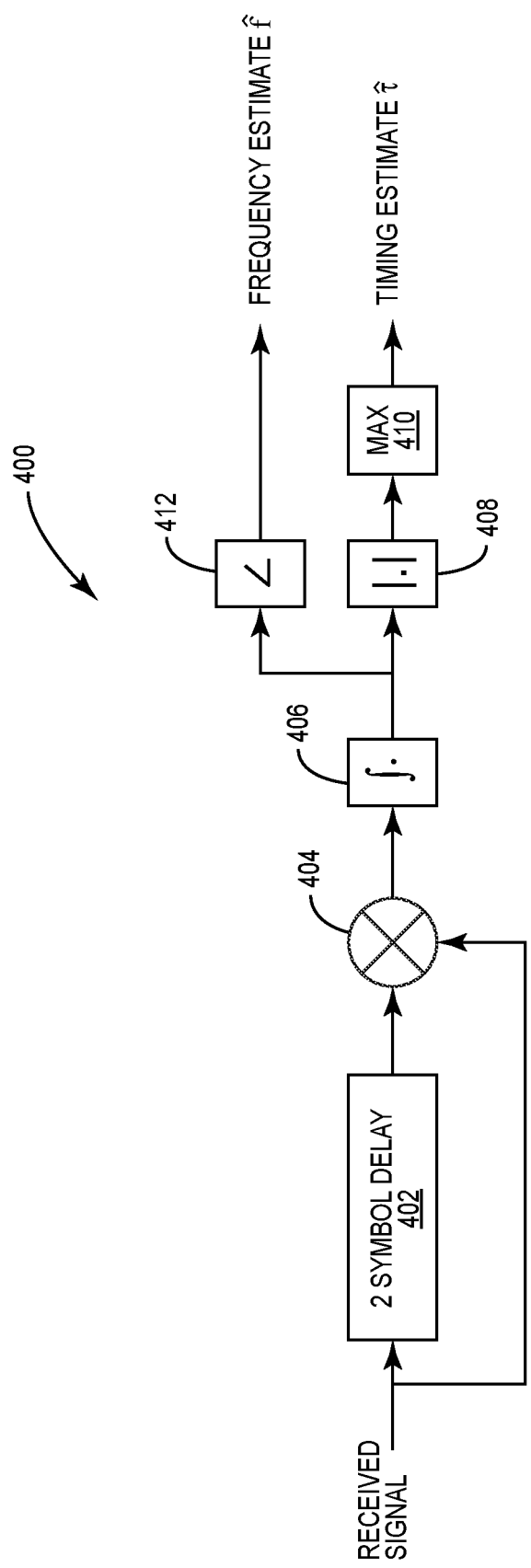
FIG. 4 is a block diagram of an auto-correlation circuit such as can be used in the detection circuit of FIG. 3.

As noted above, the auto-correlation circuit 302 may be a plurality of individual auto-correlation circuits 400, one of which is shown in FIG. 4. The auto-correlation circuit 400 includes a delay circuit 402. The delay circuit 402 may provide a two-symbol delay (e.g., 2 µs, 4 µs, 8 µs, 16 µs). An incoming signal is split and provided to the delay circuit 402 while preserving the original signal. The original signal and the delayed signal are correlated against one another by a correlator circuit 404. This correlated value is accumulated or integrated by an accumulator 406 over some period to remove noise, and a magnitude is generated by a circuit 408. A maximum of the output of the circuit 408 is secured by a circuit 410, which provides a timing estimate. The output of the accumulator 406 is also provided to a comparator 412. The output of the accumulator 406 will rise to a large value if a repeated pattern matching the delay value is present, thereby providing a frequency estimate.

Figure 5:
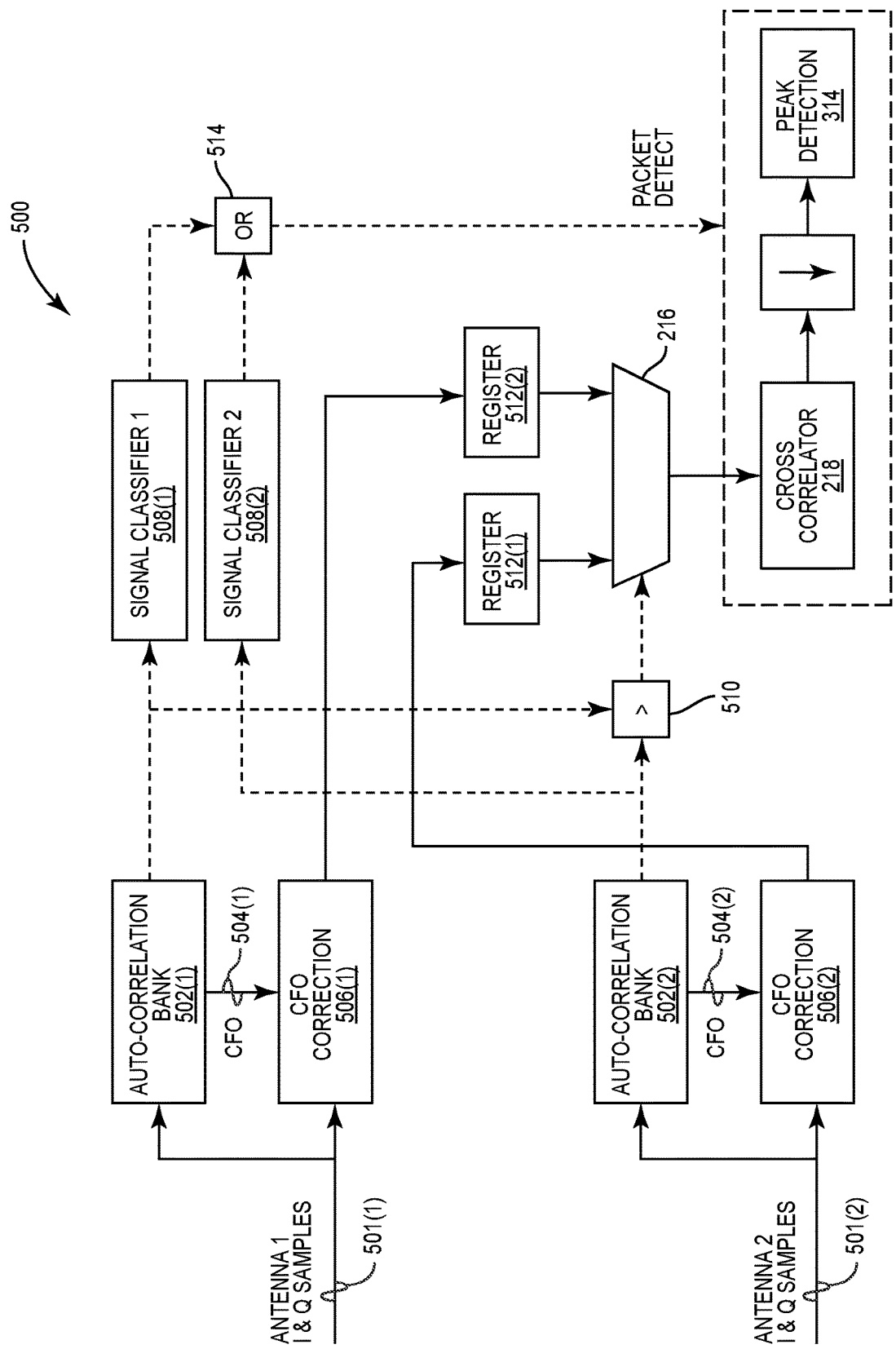
FIG. 5 is a block diagram of the detection circuitry and antenna selection circuitry of the present disclosure.

When a computing device has multiple antennas, separate antenna chains may be provided for each antenna, as better illustrated by receiver 500 in FIG. 5. The receiver 500 includes, in essence, two distinct detection circuits 212 with a shared correlation circuit 218. More specifically, incoming signals 501(1)-501(2) are split and provided to auto-correlation banks 502(1)-502(2). The auto-correlation banks 502(1)-502(2) may provide frequency signals 504(1)-504(2) to CFO circuits 506(1)-506(2). The auto-correlation banks 502(1)-502(2) also provide AC values to signal classifier circuits 508(1)-508(2).

The outputs of the auto-correlation banks 502(1)-502(2) are provided to a comparator circuit 510, which determines which signal is larger. The comparator circuit 510 provides an indication to the MUX 216. Additionally, the outputs of the auto-correlation banks 502(1)-502(2) are provided to registers 512(1)-512(2) (analogous to the buffers 210(1)-210(2)). The MUX 216 selects which signal is pulled from the registers 512(1)-512(2) and provided to the correlation circuit 218, which outputs the peak detection signal 314. The signal classifier circuits 508(1)-508(2) are OR'd by an OR circuit 514, which is used by the correlation circuit 218 to correlate according to the proper protocol of interest.

Instead of being used for antenna selection, the structures of the present disclosure may also be used for a spatial diversity system where once a signal is detected at a first antenna, signals from both antennas are then combined to provide spatial diversity.

Figure 6:
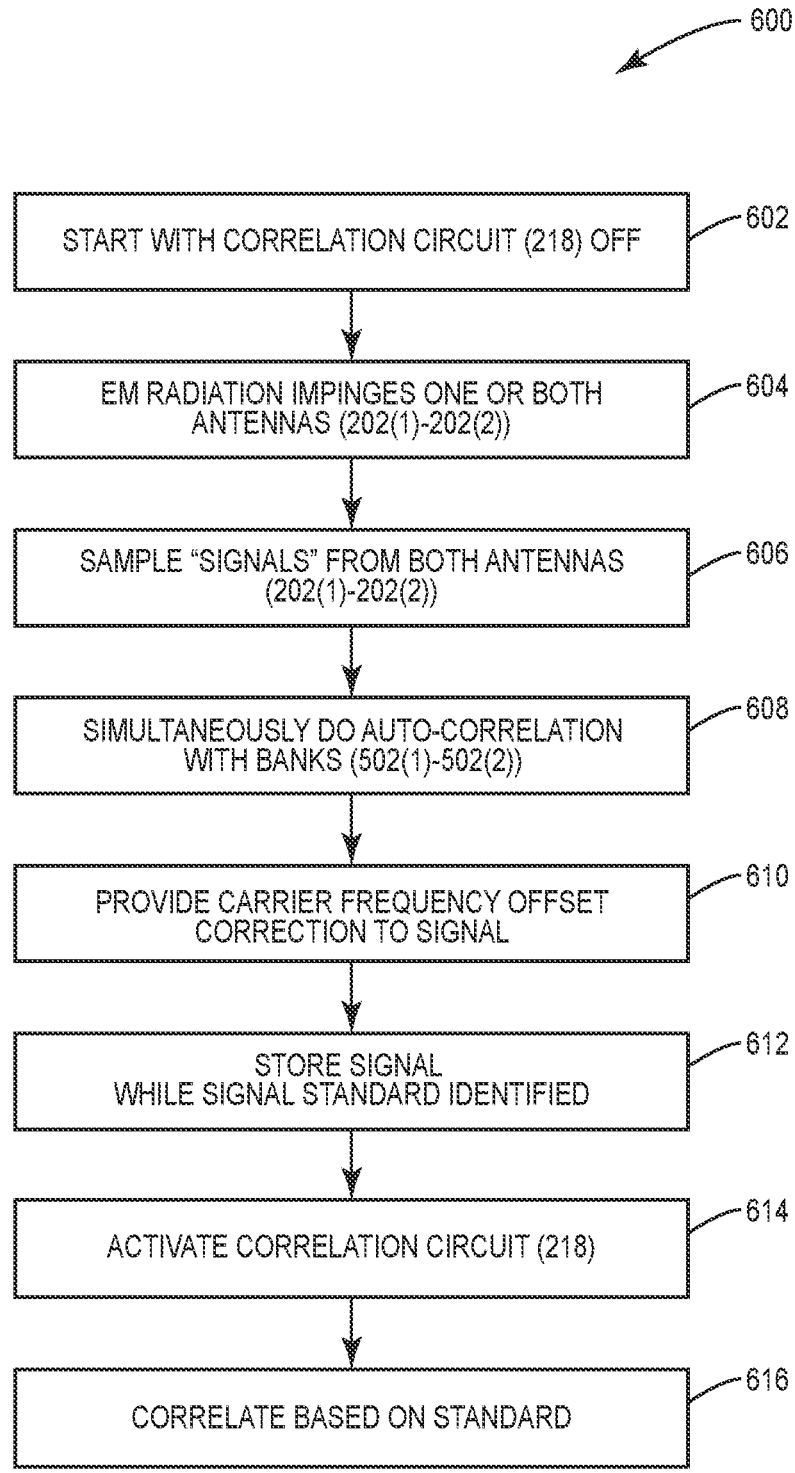
FIG. 6 is a flowchart illustrating a process for controlling a multiantenna receiver according to the present disclosure.

An exemplary process 600 for using the structures of the present disclosure is set forth in FIG. 6. The process 600 begins with the correlation circuit 218 turned off (block 602) to save power. Electromagnetic (EM) radiation impinges on one or both (or more) antennas 202(1)-202(2) (block 604). This radiation induces a current in the antennas 202(1)-202(2), which may be interpreted as signals. These possible "signals" are sampled at both antennas 202(1)-202(2) by the ADCs 206(1)-206(2) (block 606). The sampled signals are provided simultaneously to the auto-correlation banks 502(1)-502(2) (block 608), which test for correlation indicative of a periodic signal corresponding to a preamble pattern at each of the various protocols of interest (e.g., BLE, LR BLE, ZIGBEE, etc.).

The process 600 also provides a CFO correction to the signal (block 610). The "signals" are stored in the registers 512(1)-512(2) while the signal classifier circuits 508(1)-508(2) identify which protocol is likely being used by the periodic signal (block 612). Once the control circuit 214 determines that the "signal" is sufficiently periodic and is likely in a certain protocol, the control circuit 214 activates the correlation circuit 218 (block 614) to correlate the signal based on the chosen standard (block 616).

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications, as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein but is to be accorded the widest scope consistent with the principles and novel features disclosed herein.

What is claimed is:

1. A receiver comprising:
   a first auto-correlation circuit configured to receive a first sampled signal from a first antenna to detect a periodic signal within the first sampled signal;
   a second auto-correlation circuit configured to receive a second sampled signal from a second antenna to detect the periodic signal within the second sampled signal;
   a comparator coupled to the first auto-correlation circuit and the second auto-correlation circuit and configured to indicate which of the first auto-correlation circuit and the second auto-correlation circuit better detected the periodic signal;
   a correlation circuit coupled to the first auto-correlation circuit and the second auto-correlation circuit and configured to perform a correlation on one of the first sampled signal or the second sampled signal; and
   a control circuit configured to keep the correlation circuit inactive until the periodic signal is detected by one of the first auto-correlation circuit or the second auto-correlation circuit.

2. The receiver of claim 1, wherein:
   the first auto-correlation circuit comprises a first auto-correlation bank comprising a first plurality of auto-correlation circuits; and
   the second auto-correlation circuit comprises a second auto-correlation bank comprising a second plurality of auto-correlation circuits.

3. The receiver of claim 2, wherein different ones of the first plurality of auto-correlation circuits are configured to correlate to periodic signals having different periods.

4. The receiver of claim 3, wherein the different periods correspond to different wireless protocols.

5. The receiver of claim 4, wherein the different wireless protocols include at least Long Range BLUETOOTH LOW ENERGY (LR BLE).

6. The receiver of claim 4, further comprising:
   a first signal classifier circuit coupled to the first auto-correlation bank; and
   a second signal classifier circuit coupled to the second auto-correlation bank.

7. The receiver of claim 6, wherein the first signal classifier circuit is configured to identify which wireless protocol is present based on a detected period.

8. The receiver of claim 1, further comprising a carrier frequency offset (CFO) circuit configured to provide an offset to the first sampled signal and the second sampled signal.

9. The receiver of claim 1, further comprising a register coupled to the first auto-correlation circuit and configured to store the first sampled signal.

10. The receiver of claim 1, further comprising a multiplexer configured to select between the first sampled signal and the second sampled signal based on an input from the control circuit.

11. A method for controlling a receiver, comprising:
    receiving a first sampled signal and a second sampled signal;
    performing an auto-correlation on the first sampled signal with a first delay to determine a periodicity of the first sampled signal;
    performing an auto-correlation on the second sampled signal with the first delay to determine a periodicity of the second sampled signal;
    selecting the first sampled signal or the second sampled signal based on which has a better correlation for a given periodicity; and
    turning on a correlation circuit to correlate a selected signal from amongst the first sampled signal and the second sampled signal.

12. The method of claim 11, further comprising sampling a first signal to generate the first sampled signal.

13. The method of claim 11, further comprising providing a carrier frequency offset to the first sampled signal.

14. The method of claim 11, wherein performing the auto-correlation on the first sampled signal comprises using an auto-correlation bank comprising a plurality of auto-correlation circuits, each corresponding to a different period.

15. The method of claim 14, further comprising classifying a signal based on a detected periodicity.

* * * * *